United States Patent
Wang

(10) Patent No.: US 9,803,501 B2
(45) Date of Patent: Oct. 31, 2017

(54) ENGINE MID-TURBINE FRAME DISTRIBUTIVE COOLANT FLOW

(71) Applicant: United Technologies Corporation, Hartford, CT (US)

(72) Inventor: Cheng-Zhang Wang, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 368 days.

(21) Appl. No.: 14/607,102

(22) Filed: Jan. 28, 2015

(65) Prior Publication Data

US 2016/0245114 A1    Aug. 25, 2016

Related U.S. Application Data

(60) Provisional application No. 61/939,950, filed on Feb. 14, 2014.

(51) Int. Cl.
 *F01D 25/14*    (2006.01)
 *F01D 25/16*    (2006.01)
 (Continued)

(52) U.S. Cl.
 CPC ............ *F01D 25/14* (2013.01); *F01D 9/041* (2013.01); *F01D 25/12* (2013.01); *F01D 25/162* (2013.01); *F02C 7/18* (2013.01); *F05D 2220/3213* (2013.01); *F05D 2240/126* (2013.01); *F05D 2240/128* (2013.01); *F05D 2240/14* (2013.01); *F05D 2250/313* (2013.01); *F05D 2260/201* (2013.01); *Y02T 50/676* (2013.01)

(58) Field of Classification Search
 CPC .......... F01D 25/14; F01D 9/041; F01D 25/12; F01D 25/162; F02C 7/18; F05D 2220/3213; F05D 2240/128; F05D 2250/313; F05D 2240/14; F05D 2240/126; F05D 2260/201; Y02T 50/676
 USPC ............................ 415/115, 142, 116; 60/785
 See application file for complete search history.

(56) References Cited

U.S. PATENT DOCUMENTS 4,321,007 A    3/1982  Dennison et al.
5,160,241 A *  11/1992  Glynn .................... F01D 9/06
                                                      415/116
(Continued)

FOREIGN PATENT DOCUMENTS

EP    1526251 A1    4/2005
EP    2264282 A2    12/2010
(Continued)

OTHER PUBLICATIONS

Extended European Search Report for EP Application No. 15154920.1 dated Jun. 22, 2015.

*Primary Examiner* — Marina Tietjen
(74) *Attorney, Agent, or Firm* — Carlson, Gaskey & Olds, P.C.

(57) ABSTRACT

A turbine engine includes a frame assembly including an outer cavity and an inner cavity with the outer cavity including at least one opening configured and adapted to communicate cooling air to the turbine case. A baffle within the outer cavity includes a plurality of openings for directing cooling airflow into the outer cavity for preventing impingement on a radially inner wall of the outer cavity for maintaining a desired temperature of the cooling air within the outer cavity.

17 Claims, 6 Drawing Sheets

(51) Int. Cl.
*F02C 7/18* (2006.01)
*F01D 9/04* (2006.01)
*F01D 25/12* (2006.01)

(56) References Cited

U.S. PATENT DOCUMENTS

| | | | | |
|---|---|---|---|---|
| 5,165,847 | A * | 11/1992 | Proctor | F01D 11/08 |
| | | | | 415/115 |
| 5,292,227 | A | 3/1994 | Czachor et al. | |
| 5,630,703 | A | 5/1997 | Hendley et al. | |
| 6,929,445 | B2 * | 8/2005 | Zatorski | F01D 5/081 |
| | | | | 415/115 |
| 8,100,633 | B2 * | 1/2012 | Propheter-Hinckley | F01D 9/065 |
| | | | | 415/115 |
| 8,245,518 | B2 | 8/2012 | Durocher et al. | |
| 8,366,382 | B1 | 2/2013 | Muldoon et al. | |
| 8,371,127 | B2 | 2/2013 | Durocher et al. | |
| 2003/0161716 | A1 * | 8/2003 | Nguyen | F01D 25/14 |
| | | | | 415/1 |
| 2008/0206042 | A1 * | 8/2008 | Lee | F01D 5/143 |
| | | | | 415/116 |
| 2009/0238678 | A1 * | 9/2009 | Nyamu | F01D 5/084 |
| | | | | 415/116 |
| 2010/0303610 | A1 * | 12/2010 | Wang | F01D 5/18 |
| | | | | 415/115 |
| 2011/0079019 | A1 | 4/2011 | Durocher et al. | |
| 2013/0078080 | A1 * | 3/2013 | Durocher | F01D 25/125 |
| | | | | 415/110 |
| 2013/0149107 | A1 * | 6/2013 | Munshi | F01D 25/12 |
| | | | | 415/116 |

FOREIGN PATENT DOCUMENTS

EP     2573329 A2    3/2013
WO     2014/175969 A2   10/2014

* cited by examiner

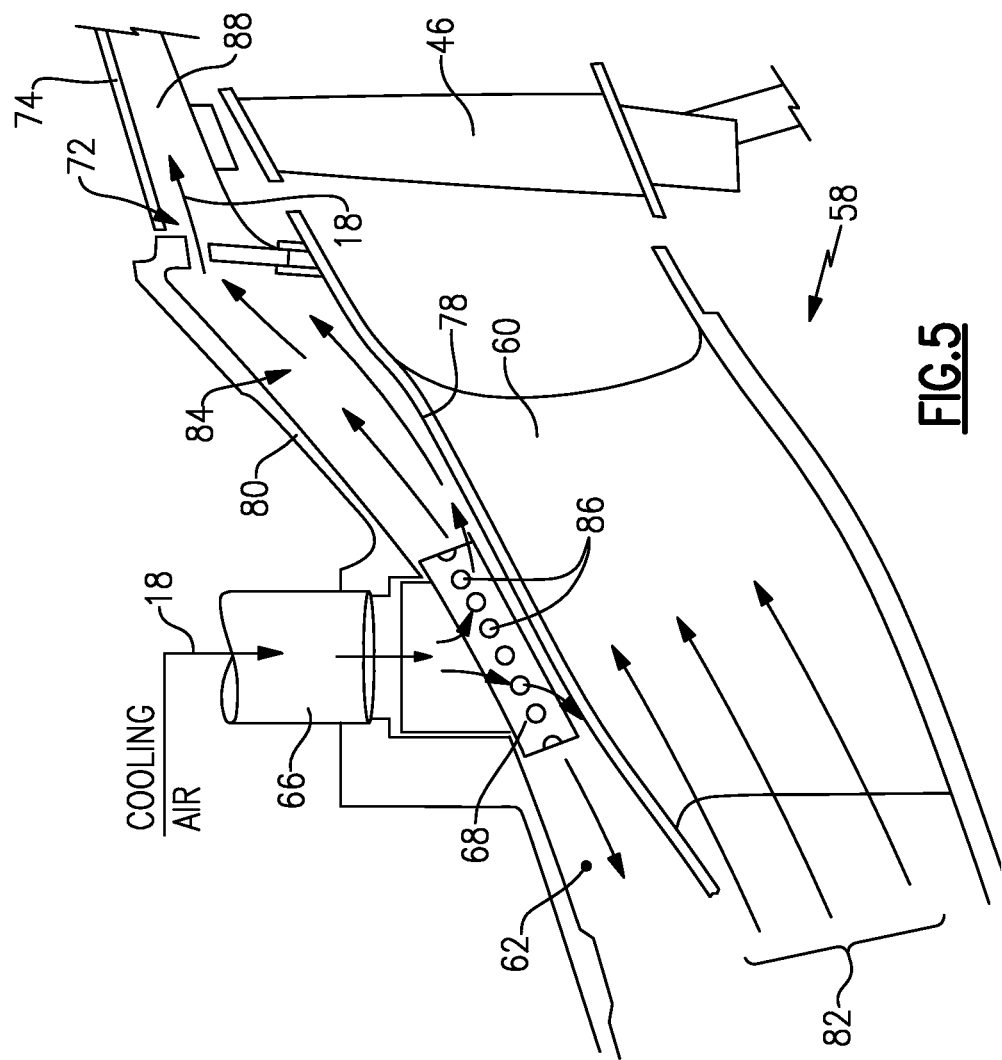
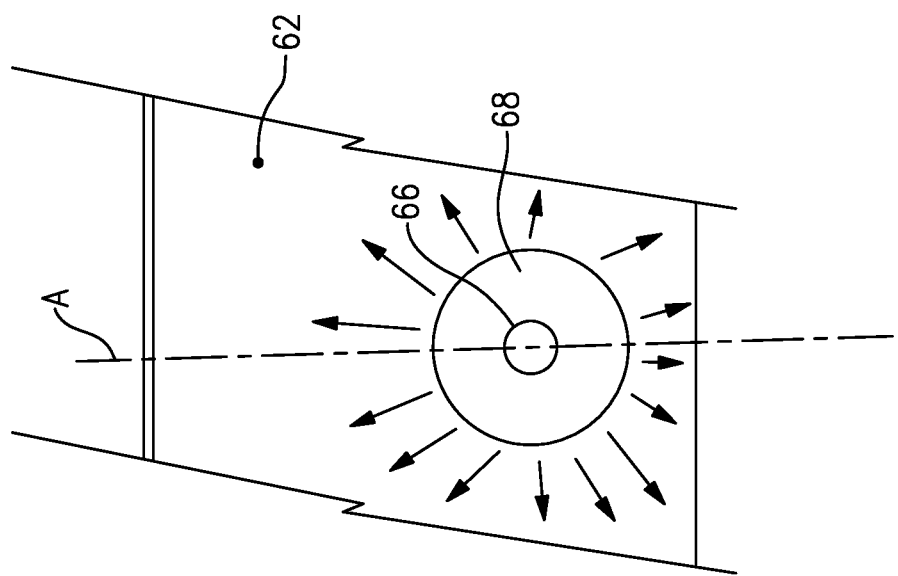

ENGINE MID-TURBINE FRAME DISTRIBUTIVE COOLANT FLOW

REFERENCE TO RELATED APPLICATIONS

This application claims priority to U.S. Provisional Application No. 61/939,950 filed on Feb. 14, 2014.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A mid-turbine frame is sometimes provided between the high pressure turbine and the low pressure turbine to aid in supporting bearing assemblies. The low pressure turbine case requires cooling air to maintain temperatures within a desired limit. Cooling air is extracted from the compressor section and routed to a cavity within the mid-turbine frame. Cooling air from the cavity within the mid-turbine frame is then routed to cool the low pressure turbine case. In some applications, the mid-turbine frame is at a temperature such that cooling air within the cavity is heated above a temperature capable of sufficiently cooling the low pressure turbine case.

Accordingly, it is desirable to design and develop cooling features and systems for maintaining desired temperatures within the turbine case.

SUMMARY

A turbine engine according to an exemplary embodiment of this disclosure, among other possible things includes a turbine section including a turbine case disposed about an axis. A frame assembly defines an outer cavity. The outer cavity includes radially outer wall, a radially inner wall and at least one opening configured and adapted to communicate cooling air to the turbine case. A baffle is configured to receive cooling air through the radially outer wall and direct cooling airflow within the outer cavity to prevent impingement on the inner wall.

In a further embodiment of any of the foregoing turbine engines, the baffle includes a plurality of openings for directing cooling air transverse to the radially inner wall of the outer cavity.

In a further embodiment of any of the foregoing turbine engines, the baffle is disposed within the outer cavity.

In a further embodiment of any of the foregoing turbine engines, the plurality of openings are disposed about an outer periphery of the baffle for directing cooling airflow forward, aft and circumferentially within the outer cavity.

In a further embodiment of any of the foregoing turbine engines, the plurality of openings includes holes.

In a further embodiment of any of the foregoing turbine engines, the plurality of openings includes slots.

In a further embodiment of any of the foregoing turbine engines, includes a compressor section in communication with a supply tube for supplying cooling air to the baffle.

In a further embodiment of any of the foregoing turbine engines, the compressor section includes a high pressure compressor.

In a further embodiment of any of the foregoing turbine engines, the turbine section includes a high pressure turbine and a low pressure turbine and the frame is a mid-turbine frame which defines a flow path between the high pressure turbine and the low pressure turbine.

A frame assembly for a turbine engine according to an exemplary embodiment of this disclosure, among other possible things includes a plurality of vane struts extending radially outward relative to an axis, an outer cavity which includes an opening for communicating cooling air to a turbine section of the turbine engine, and a baffle within the outer cavity configured and adapted to receive cooling air. The baffle includes a plurality of openings for directing cooling airflow into the outer cavity for preventing impingement on a radially inner wall of the outer cavity for maintaining a desired temperature of the cooling air within the outer cavity.

In a further embodiment of any of the foregoing frame assemblies, the plurality of openings direct cooling airflow forward, aft and circumferentially within the outer cavity.

In a further embodiment of any of the foregoing frame assemblies, the plurality of openings includes a plurality of holes.

In a further embodiment of any of the foregoing frame assemblies, the plurality of openings includes a plurality of slots.

In a further embodiment of any of the foregoing frame assemblies, the plurality of openings define an total opening area for metering cooling airflow into the outer cavity.

In a further embodiment of any of the foregoing frame assemblies, includes an inner cavity radially inward of the plurality of vane struts. The inner cavity is in communication with the outer cavity.

In a further embodiment of any of the foregoing frame assemblies, the opening for communicating cooling air to the turbine section include a plurality of openings disposed circumferentially within the outer cavity.

In a further embodiment of any of the foregoing frame assemblies, the baffle includes at least two baffles directing cooling air within the outer cavity.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 5 is a schematic view of the outer cavity and example baffle.

FIG. 6 is a top schematic view of the example baffle.

DETAILED DESCRIPTION

Figure 1:
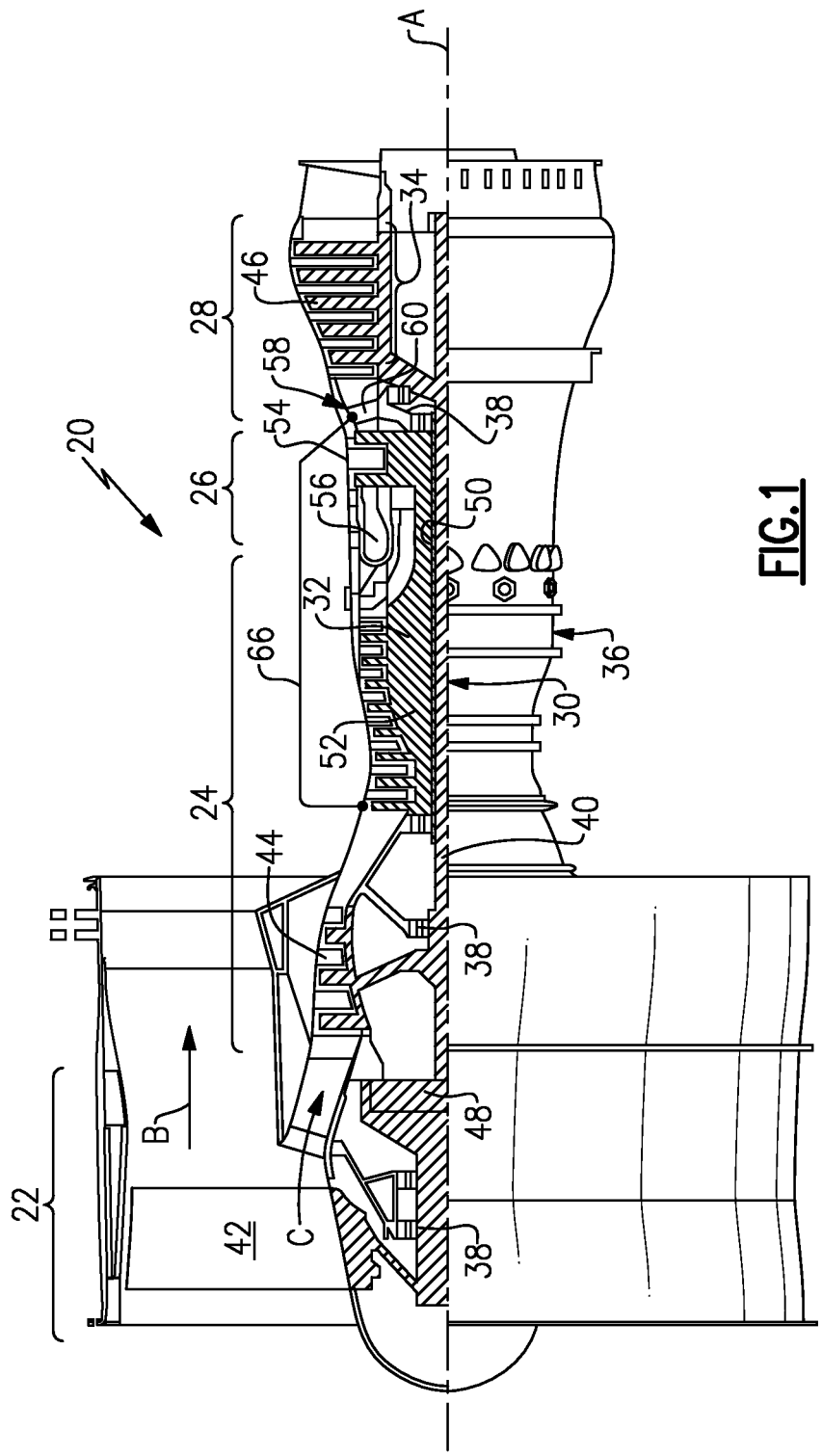
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame assembly 58 of the engine static structure 36 is arranged generally between the high pressure turbine 54 and the low pressure turbine 46. The mid-turbine frame assembly 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46.

The mid-turbine frame assembly 58 includes vanes 60, which are in the core airflow path C and function as an inlet guide vane for the low pressure turbine 46. Temperatures of the exhaust gases are such that cooling of the mid-turbine frame assembly 58 may be required. A low temperature cooling air flow (LTCA) supply tube 66 communicates relatively cool air from the compressor section 24 to the turbine section 28. In this example, the supply tube 66 communicates relatively low temperature cooling air 18 from one of the initial stages of the high pressure compressor 52 to the mid-turbine frame assembly 58.

Utilizing the vane 60 of the mid-turbine frame assembly 58 as the inlet guide vane for low pressure turbine 46 decreases the length of the low pressure turbine 46 without increasing the axial length of the mid-turbine frame assembly 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second (350 meters/second).

The example gas turbine engine includes the fan 42 that comprises in one non-limiting embodiment less than about 26 fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
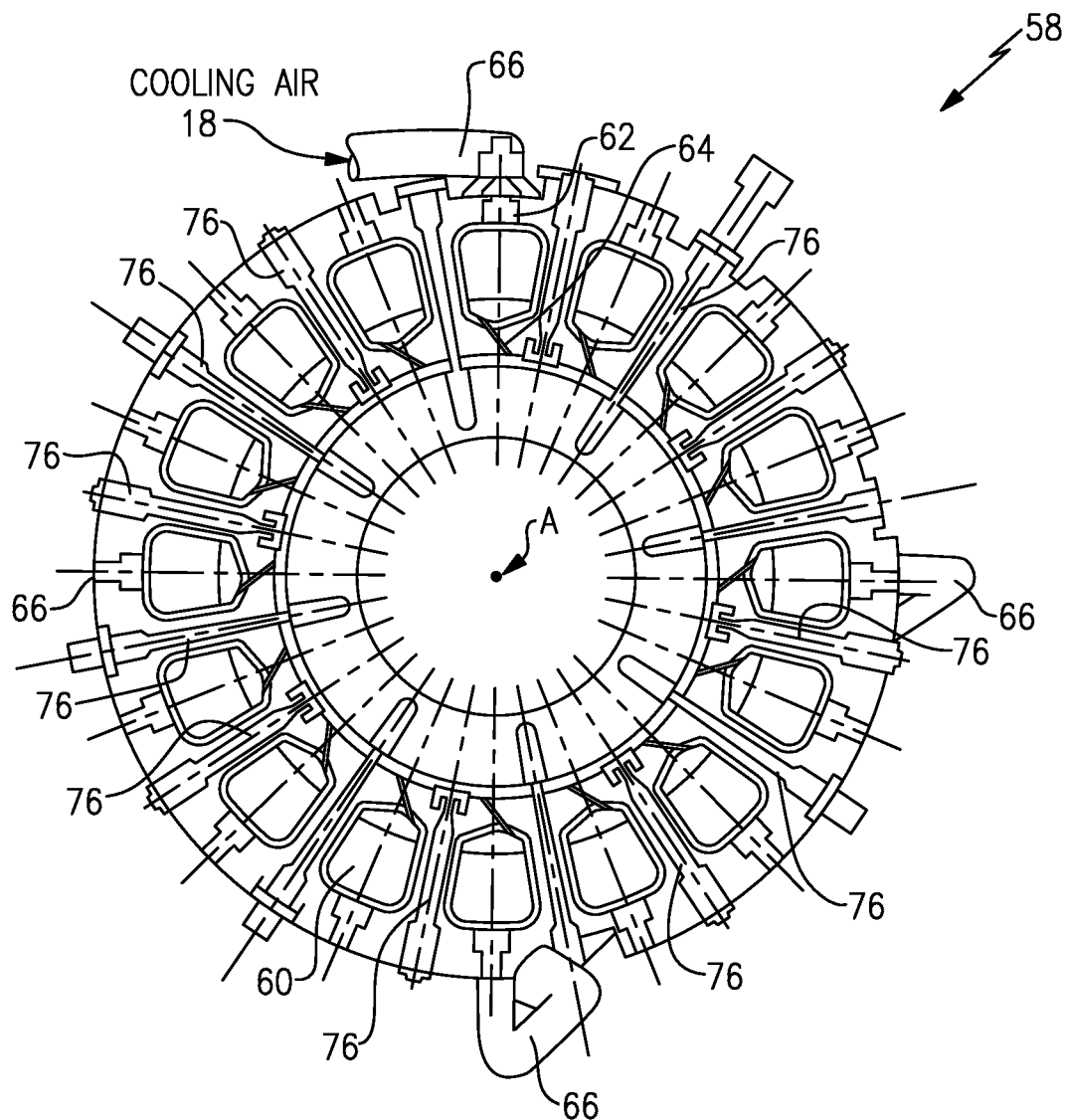
FIG. 2 is an axial section view of an example mid-turbine frame assembly.
Figure 3:
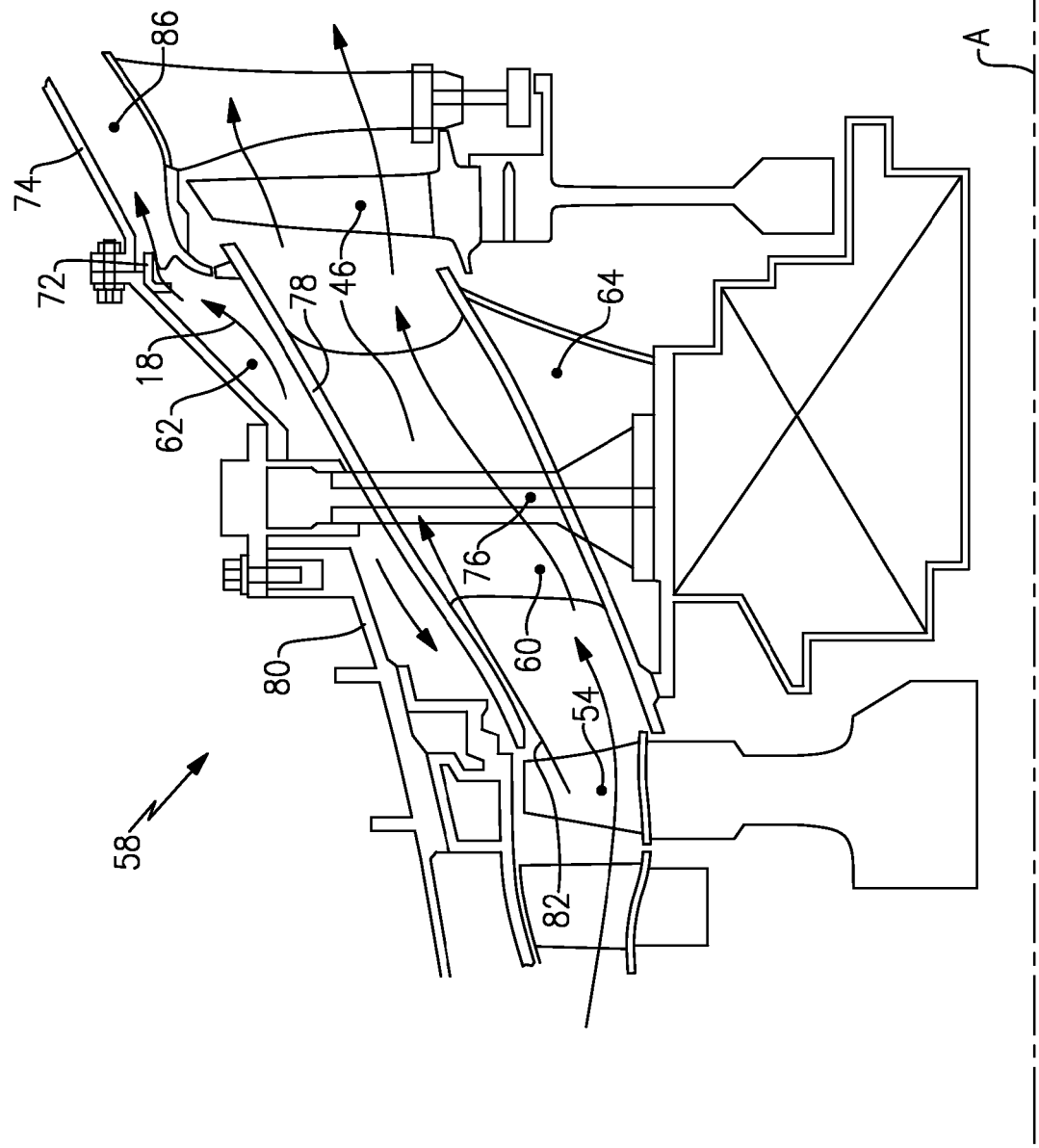
FIG. 3 is a sectional view of a portion of the example mid-turbine frame assembly.
Figure 4:
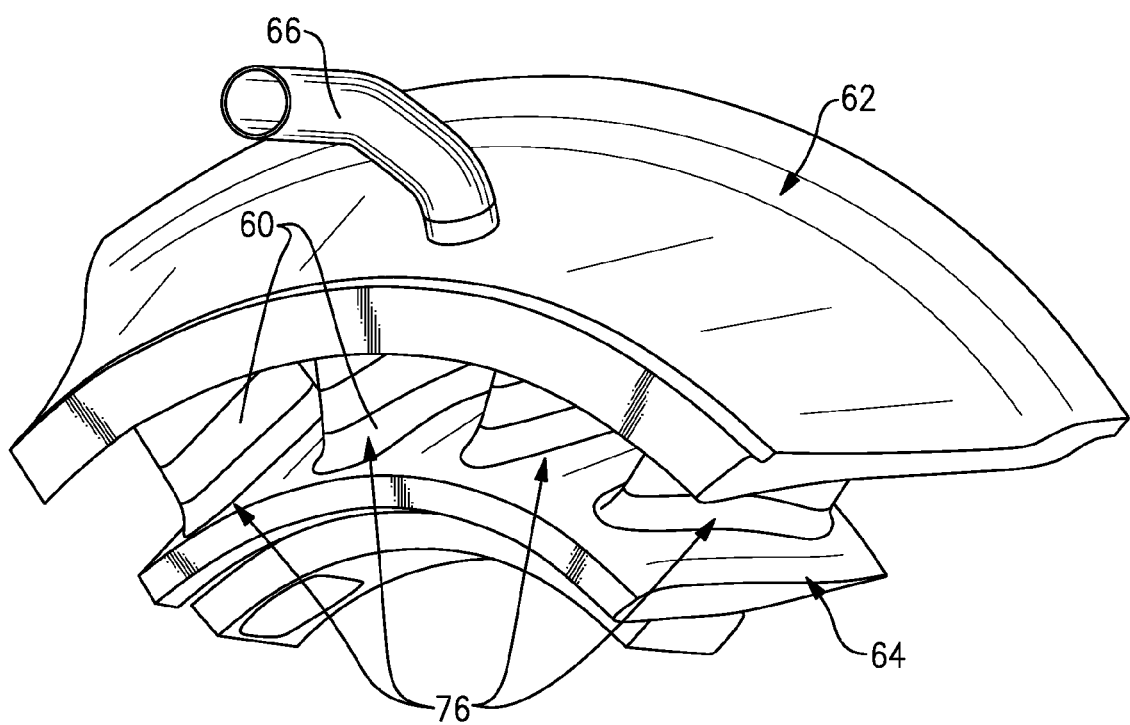
FIG. 4 is a perspective view of a portion of an outer cavity of the mid-turbine frame assembly.

Referring to FIGS. 2, 3 and 4 an example mid-turbine frame assembly 58 includes an outer cavity 62 and an inner cavity 64. The outer cavity 62 is disposed radially outward of the airfoils 60 and the inner cavity 64 is disposed radially inward of the airfoils 60. Several LTCA supply pipes 66 deliver cooling air from the compressor section 24 to the outer cavity 62. In this example, four (4) supply tubes 66 are arranged ninety (90) degrees apart about the circumference of the mid-turbine vane assembly 58. As appreciated, different numbers of supply tubes 66 could be utilized in different locations about the mid-turbine vane assembly 58. In this example, cooling air 18 is extracted from an initial stage of the high pressure compressor 52. As appreciated, cooling air may be obtained from other portions of the engine 20 that include air at appropriate pressures and temperatures.

The mid-turbine frame assembly 58 includes a plurality of airfoils 60 and vane struts 76 arranged circumferentially about the engine axis A. The airfoils 60 define passages between the high pressure turbine 54 and the low pressure turbine 46. The vane struts 76 provide support for structures such as bearings supported radially inward of the airfoils 60. The outer cavity 62 and inner cavity 64 are provided with cooling air 18 that is circulated from the outer cavity 62 to the inner cavity 64 through openings between the airfoils 60 and vane struts 76.

The outer cavity 62 is defined between a radially outer wall 80 and a radially inner wall 78. The radially inner wall 78 is exposed to high temperature gas flow 82 and it therefore operates at a substantially higher temperature than the radially outer wall 80.

Cooling air 18 is communicated to the outer cavity 62 to cool the mid-turbine frame 58. The cooling air 18 is also communicated through the outer cavity 62 to a low pressure turbine (LPT) cavity 86 defined within a turbine case 74 (FIG. 3) through a plurality of supply holes 72. Cooling air 18 may also be communicated to the LPT cavity 86 through a feather seal 72 defined at an aft portion of the outer cavity 62.

The mid-turbine frame assembly 58 is very hot and therefore the temperature of the cooling air 18 provided to cool the low pressure turbine case 74 may require additional cooling features to provide a flow of a desired temperature determined to provide the desired cooling of the low pressure turbine 46. Cooling air 18 that directly impinges on the radially inner wall 78 is heated and can reach temperatures above desired threshold values for fooling the turbine case 74. Additionally, direct impingement of cooling air onto the inner wall 78 can result in non-uniform temperatures of the inner wall 78 that can increase thermal stresses.

Accordingly, the example mid-turbine frame assembly 58 includes features that prevent direct impingement and provide a more uniform temperature distribution within the inner wall 78.

Figure 7:
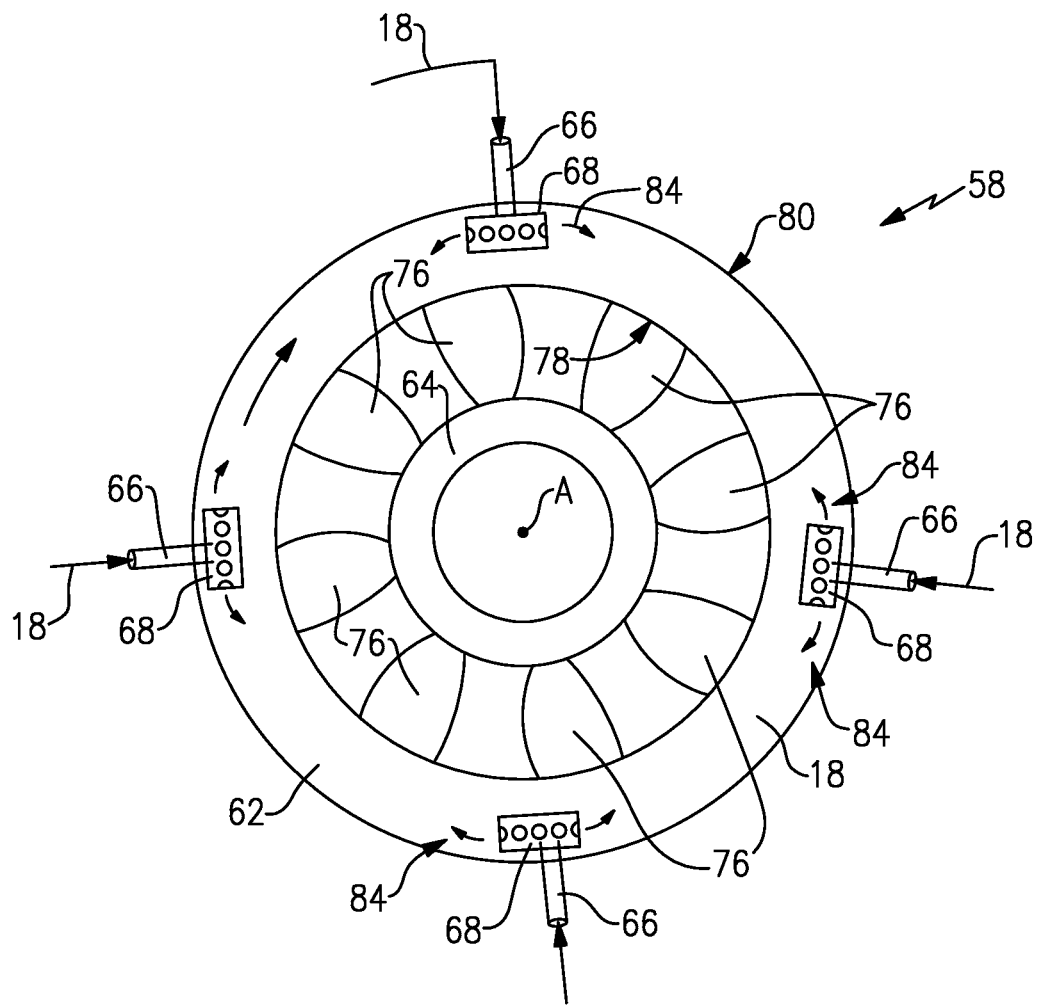
FIG. 7 is a sectional view of cooling airflow within the example mid-turbine frame assembly.

Referring to FIGS. 5, 6, and 7, the supply pipe 66, communicates cooling air flow 18 to a baffle 68. The baffle 68 is disposed within the outer cavity 62 and includes a plurality of openings 86. In the disclosed example, the baffle 68 directs incoming cooling air outward in a direction transverse to the inner radial wall 78 to prevent direct impingement of cooling air on the inner radial wall 78.

The example baffle 68 receives cooling air flow 18 and distributes the cooling airflow as indicated by arrows 84 forward, aft, and circumferentially within the outer cavity 62 such that the cooling air flow 84 is directed transverse relative to the incoming airflow 18. The transverse direction can include components in the forward and aft direction parallel with the axis A and also include a circumferential component within the outer cavity 62.

In this example, the baffle 68 is cylindrical and includes openings disposed about an outer periphery to distribute cooling airflow 84 into the outer cavity 62. It should be understood that although a cylindrical shape is disclosed, the baffle 68 may comprise any shapes desired to direct airflow within the outer cavity 62. Moreover, the openings 86 are holes that provide a desired flow area for the cooling airflow 84. The openings 86 may be holes, slots, or any other shape that provides a desired direction of cooling airflow into the outer cavity 62.

The openings 86 combine to provide a desired flow area for the cooling airflow 84. The flow area provided by the plurality of openings 86 can be tailored to provide a desired metering of cooling airflow as is desired for cooling of both the mid-turbine frame and the turbine case 74.

The directed airflow 84 does not directly impinge on the inner radial wall 78 and therefore does not become heated above desired threshold limits. Moreover, the baffle directs cooling airflow 84 to provide a substantially uniform temperature of the radially inner wall 78. The reduction in heating of the cooling airflow 84 within the outer cavity 64 provides a uniform flow of cooling air into through the openings 72 into the cavity 88 of the turbine case 74.

Accordingly, the disclosed baffle 68 prevents impingement of cooling airflow on the radially inner wall 78 of the cavity 62 to generate a more uniform temperature. Additionally, the baffle 68 directs cooling air transverse to the radially inner wall 78 such that cooling air within the cavity 62 may be maintained at a lower temperature within a desired threshold temperature range for cooling of a turbine case 74.

The example mid-turbine frame 58 includes baffles 68 at each inlet for cooling airflow 18 (FIG. 7) such that airflow is directed circumferentially about the axis A. In this example, inlets 66 are spaced evenly apart about the axis A and provide cooling air to a corresponding baffle 68. The baffle 68 distributes the cooling airflow 84 transverse to incoming airflow 18 and to the inner radial wall 78 to prevent absorption of excessive heat in any one location. The distribution provided by the baffles 68 generate a more uniform temperature distribution in both the radial wall 78 and the cooling air 84 circulating though the outer cavity 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine, comprising:
   a turbine section including a turbine case disposed about an axis;
   a frame assembly defining an outer cavity, wherein the outer cavity includes radially outer wall, a radially inner wall and at least one opening configured and adapted to communicate cooling air to the turbine case; and
   a baffle including an inlet to receive cooling air through the radially outer wall and a plurality of openings that direct cooling airflow outward in a plurality of directions transverse to the radially inner wall within the outer cavity to prevent impingement on the inner wall.

2. The turbine engine as recited in claim 1, wherein the baffle is disposed within the outer cavity.

3. The turbine engine as recited in claim 2, wherein the plurality of openings are disposed about an outer periphery of the baffle for directing cooling airflow forward, aft and circumferentially within the outer cavity.

4. The turbine engine as recited in claim 1, wherein the plurality of openings comprises holes.

5. The turbine engine as recited in claim 1, wherein the plurality of openings comprises slots.

6. The turbine engine as recited in claim 1, including a compressor section in communication with a supply tube for supplying cooling air to the baffle.

7. The turbine engine as recited in claim 6, wherein the compressor section comprises a high pressure compressor.

8. The turbine engine as recited in claim 1, wherein the turbine section includes a high pressure turbine and a low pressure turbine and the frame is a mid-turbine frame which defines a flow path between the high pressure turbine and the low pressure turbine.

9. A frame assembly for a turbine engine, the frame assembly comprising:
   a plurality of vane struts extending radially outward relative to an axis;
   an outer cavity which includes an opening for communicating cooling air to a turbine section of the turbine engine; and
   a baffle within the outer cavity including and inlet to receive cooling air, the baffle including a plurality of openings disposed circumferentially about the baffle that direct cooling airflow outward in a plurality of directions transverse to the radially inner wall within the outer cavity for preventing impingement on a radially inner wall of the outer cavity for maintaining a desired temperature of the cooling air within the outer cavity.

10. The frame assembly as recited in claim 9, wherein the plurality of openings direct cooling airflow forward, aft and circumferentially within the outer cavity.

11. The frame assembly as recited in claim 9, wherein the plurality of openings comprises a plurality of holes.

12. The frame assembly as recited in claim 9, wherein the plurality of openings comprises a plurality of slots.

13. The frame assembly as recited in claim 9, wherein the plurality of openings define a total opening area for metering cooling airflow into the outer cavity.

14. The frame assembly as recited in claim 9, including an inner cavity radially inward of the plurality of vane struts, wherein the inner cavity is in communication with the outer cavity.

15. The frame assembly as recited in claim 9, wherein the baffle comprises at least two baffles directing cooling air within the outer cavity.

16. The turbine engine as recited in claim 1, wherein the baffle comprises a circumferential peripheral wall transverse to the radially outer wall of the outer cavity and the plurality of openings are spaced circumferentially within the circumferential peripheral wall to direct the cooling airflow in the plurality of directions transverse to the radially inner wall.

17. The frame assembly as recited in claim 9, wherein the baffle comprises a circumferential peripheral wall transverse to the radially outer wall of the outer cavity and the plurality of openings are spaced circumferentially within the circumferential peripheral wall.

* * * * *

UNITED STATES PATENT AND TRADEMARK OFFICE
CERTIFICATE OF CORRECTION

Page 1 of 1

PATENT NO. : 9,803,501 B2
APPLICATION NO. : 14/607102
DATED : October 31, 2017
INVENTOR(S) : Cheng-Zhang Wang It is certified that error appears in the above-identified patent and that said Letters Patent is hereby corrected as shown below:

In the Claims

In Claim 9, Column 8, Line 8; after "directions transverse to" replace "the radially inner wall" with --a radially inner wall--

In Claim 9, Column 8, Lines 9-10; after "preventing impingement on" replace "a radially inner wall" with --the radially inner wall--

In Claim 17, Column 8, Line 38; before "of the outer cavity" replace "the radially outer wall" with --a radially outer wall--

Signed and Sealed this
Twenty-eighth Day of August, 2018

Andrei Iancu
*Director of the United States Patent and Trademark Office*